W. V. GIST.
WHIFFLETREE.
APPLICATION FILED DEC. 15, 1909.
957,551.
Patented May 10, 1910.
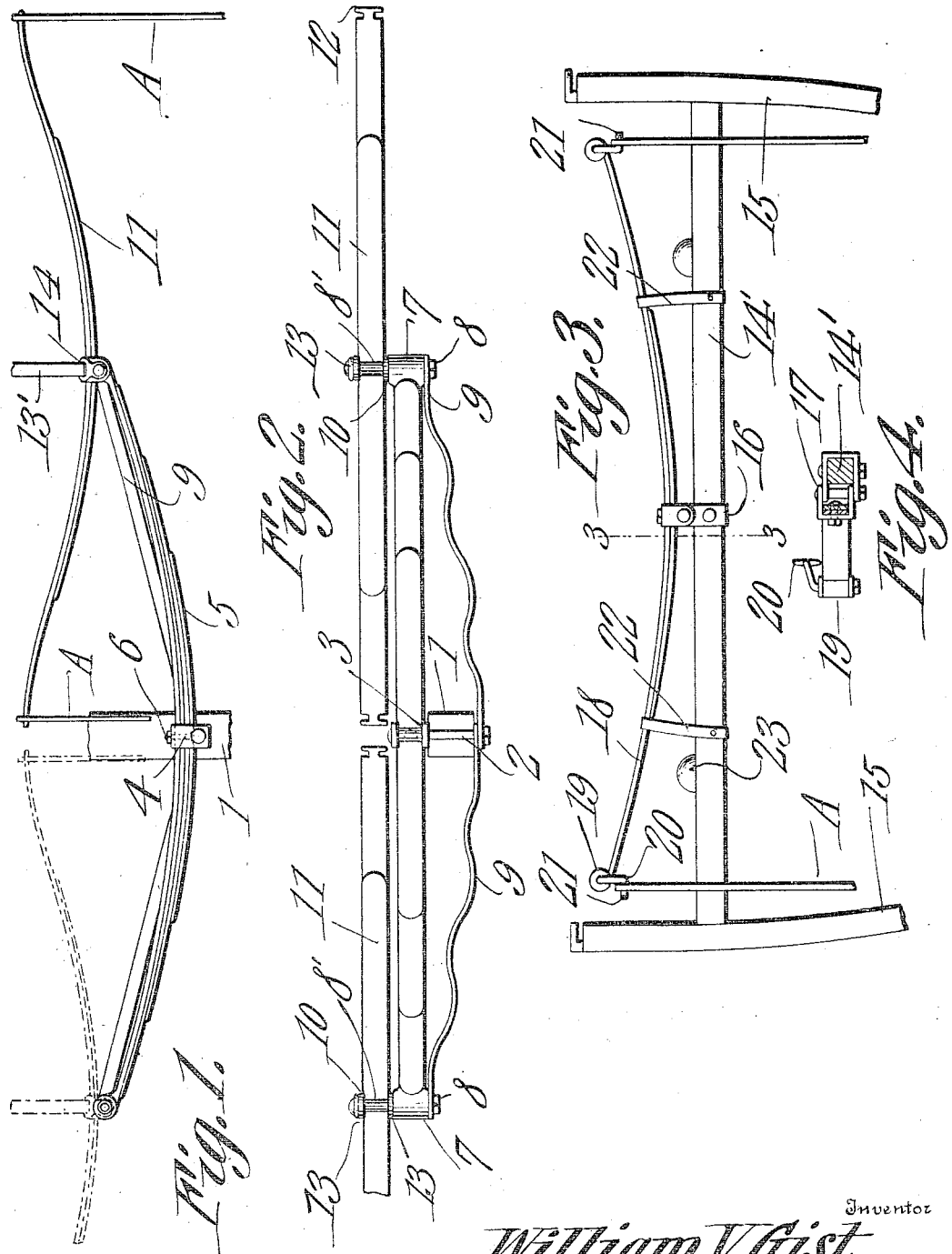

UNITED STATES PATENT OFFICE.

WILLIAM V. GIST, OF SPARTA, TENNESSEE.

WHIFFLETREE.

957,551.  Specification of Letters Patent.  Patented May 10, 1910.

Application filed December 15, 1909. Serial No. 533,213.

*To all whom it may concern:*

Be it known that I, WILLIAM V. GIST, a citizen of the United States, residing at Sparta, in the county of White and State of Tennessee, have invented a new and useful Whiffletree, of which the following is a specification.

This invention relates to whiffle trees and its object is to provide a device of this character formed of spring metal whereby the starting of a vehicle is facilitated and the strain upon the draft animal or animals reduced.

A further object is to provide a whiffle tree of this type which is simple and durable in construction and which can be readily substituted for the ordinary forms of whiffle trees.

With these and other objects in view the invention consists of certain novel details of construction and combinations of parts hereinafter more fully described and pointed out in the claims.

In the accompanying drawings the preferred forms of the invention have been shown.

In said drawings, Figure 1 is a plan view of a double tree and swingle trees embodying the present improvements, the position of one of the swingle trees being indicated by dotted lines. Fig. 2 is a front elevation of the double tree and two swingle trees mounted thereon, one end portion of one of the swingle trees being removed. Fig. 3 is a plan view of a swingle tree connected to the shafts of a vehicle. Fig. 4 is a section on line 3—3 Fig. 3.

Referring to the figures by characters of reference 1 designates a vehicle tongue having a bolt 2 extending there-through, there being a washer 3 arranged upon the tongue and through which the bolt extends, this washer constituting the bearing for a U-shaped clip 4 through which the bolt extends, the head of the bolt bearing upon the upper end of the clip. A laminated bow spring 5 extends at its center through the clip and is secured to said clip by means of a bolt 6 so that the spring is capable of swinging in a horizontal plane about the bolt 2. The end portions of the springs 5 extend rearwardly from the clips and are formed with eyes 7 each of which has a bolt 8 secured therein and extending upwardly therefrom, the lower end of the bolt being arranged within one end of a corrugated brace strip 9. One of these strips 9 is arranged under each end portion of the spring 5, the inner ends of the two strips 9 lapping under the tongue 1 so as to receive the bolt 2 which serves to bind said ends together and to hold them fixed with relation to the tongue. The strips 9 are formed of spring metal and, as they are corrugated, they will not interfere with the flexing action of spring 5. This spring 5 constitutes a double tree and the bolts 8 at the ends thereof constitute pivots for U-shaped clips 10 similar to the clips 4, each of these clips 10 embracing the middle portion of a laminated bow spring 11 constituting a swingle tree. The terminals of this spring 11 are provided with T-shaped heads 12 for engaging the traces A. Rings 13 may be mounted on the bolts 8 between the heads thereof and the clips 10 and each of these rings has an eye 14 designed to be engaged by a strap 13′ which may be fastened to the vehicle structure and serves to limit the swinging movement of the double tree 5. By referring to Fig. 1 it will be noted that the swingle trees, as well as the double tree, have their end portions curved rearwardly.

It will be apparent that when a device such as herein described is employed, the initial forward pull thereof will result in the flexing of the swingle and double trees, and the strain upon the draft animals is thus greatly lessened and the load can be more readily started than where non-flexible trees are employed. Each of the trees is pivotally mounted at its center so as to accommodate itself to the movement of the animal connected to it. In order that wear may be readily taken up at the pivots, the bolts 2 and 8 are preferably extended through sleeves 8′, these sleeves being engaged by the clips extending from the whiffle tree. Obviously the said sleeves can be expanded should they ever work loose.

If desired, and as shown in Fig. 3, a swingle tree, such as has been described, can be connected to the shafts of a one horse vehicle. By referring to this figure it will be noted that the bar 14′ which connects the thills 15 has a U-shaped bracket 16 embracing the middle portion thereof, this bracket being pivotally engaged by a U-shaped clip 17 similar to the clip 10 heretofore referred to. Said clip embraces and is bolted to the middle portion of a laminated bow spring 18 constituting the swingle tree and the ends of which form eyes 19 from which extend annular arms 20. These arms are formed with T-shaped heads 21 designed to be engaged by the traces A. Leather loops 22 may be attached to the bar 14, the spring 18 being extended through them so as to be limited in its movement thereby. Rubber cushions 23 may also be secured to the bar 14 and in the path of the spring so as to act as buffers for limiting the forward movement of the terminals of the swingle tree.

It is to be understood that various changes may be made in the construction and arrangement of the parts without departing from the spirit or sacrificing any of the advantages of the invention.

What is claimed is:—

1. A whiffle tree including a bow spring, a pivot device extending in front of and connected to the middle portion of the spring, transversely corrugated brace strips engaged by the pivot device, the outer ends of said strips being extended below the adjoining ends of the spring, and means for securing the ends of said strip to the spring ends.

2. A whiffle tree including a laminated bow spring having terminal eyes, a clip embracing and secured to the middle portion of the spring, a pivot device extending through the clip and in front of the spring, transversely corrugated brace strips having lapping inner ends engaged by the pivot device, the outer ends of said strips being located beneath the eyes, connecting devices extending through and beyond the eyes and securing the strips to said eyes, and a swingle tree pivotally mounted upon each of said devices, each swingle tree consisting of a laminated bow spring, a clip embracing and secured to the middle portion thereof and engaging the connecting device, and trace engaging means at the ends of the spring.

In testimony that I claim the foregoing as my own, I have hereto affixed my signature in the presence of two witnesses.

WILLIAM V. GIST.

Witnesses:
P. F. WILLBANKS,
J. H. POTTER.